(12) United States Patent
Heim et al.

(10) Patent No.: US 7,540,373 B2
(45) Date of Patent: Jun. 2, 2009

(54) SURFACE TREATING INSTALLATION COMPRISING A TRANSFER STATION

(75) Inventors: Juergen Heim, Bisingen (DE); Christoph Heizmann, Aichhalden-Rötenberg (DE)

(73) Assignee: Eisenmann Anlagenbau GmbH & Co. KG, Boeblingen (DE)

( * ) Notice: Subject to any disclaimer, the term of this patent is extended or adjusted under 35 U.S.C. 154(b) by 119 days.

(21) Appl. No.: 11/791,308

(22) PCT Filed: Oct. 5, 2005

(86) PCT No.: PCT/EP2005/010708

§ 371 (c)(1),
(2), (4) Date: Oct. 5, 2007

(87) PCT Pub. No.: WO2006/056265

PCT Pub. Date: Jun. 1, 2006

(65) Prior Publication Data

US 2008/0169172 A1    Jul. 17, 2008

(30) Foreign Application Priority Data

Nov. 22, 2004    (DE) .................... 10 2004 056 310

(51) Int. Cl.
*B65G 17/32*    (2006.01)
(52) U.S. Cl. .................. 198/801; 198/468.6; 198/345.3
(58) Field of Classification Search ............. 198/345.3, 198/346.2, 346.3, 468.01, 468.6, 801, 802; 193/37; 212/199
See application file for complete search history.

(56) References Cited

U.S. PATENT DOCUMENTS

| | | | | |
|---|---|---|---|---|
| 3,415,353 | A | * | 12/1968 | Oertle, Jr. ................... 198/801 |
| 4,082,179 | A | * | 4/1978 | Beyer ......................... 198/801 |
| 4,681,215 | A | * | 7/1987 | Martin ........................ 193/37 |
| 5,321,896 | A | | 6/1994 | Brownewell et al. |
| 5,653,324 | A | * | 8/1997 | Toeniskoetter ............ 198/345.3 |
| 6,070,712 | A | * | 6/2000 | Baez .......................... 198/802 |
| 6,274,205 | B1 | | 8/2001 | Himmelsbach et al. |
| 6,290,052 | B2 | * | 9/2001 | Pauling et al. ............. 198/801 |
| 7,497,321 | B2 | * | 3/2009 | Matsubara et al. ....... 198/465.4 |
| 2001/0002289 | A1 | | 5/2001 | Himmelsbach et al. |
| 2005/0061616 | A1 | | 3/2005 | Krannich et al. |

FOREIGN PATENT DOCUMENTS

DE    25 02 270 A1    7/1975

(Continued)

*Primary Examiner*—James R Bidwell
(74) *Attorney, Agent, or Firm*—Factor & Lake, Ltd.

(57) ABSTRACT

The invention relates to a surface treating installation, especially for treating plastic parts or automotive bodies, which includes a transfer station for vertically or horizontally transferring an object. The transfer station comprises a stationary support structure, a carriage which can travel in relation to the support structure and receives an object, and at least one guide roller via which the carriage is supported on the support structure. The at least one guide roller has a rolling surface which contacts the support structure when rolling off. The invention is characterized in that the rolling surface of the at least one guide roller consists of an antistatic material whose volume resistivity ranges between 10 Ωm and $10^9$ Ωm. The invention allows to counteract the deposition of dirt particles on the guide rollers and on the mating surfaces, thereby reducing time and/or costs required for cleaning the transfer station or for post-processing the objects.

18 Claims, 7 Drawing Sheets

FOREIGN PATENT DOCUMENTS

| | | |
|---|---|---|
| DE | 40 22 577 A1 | 1/1992 |
| DE | 197 55 437 C1 | 4/1999 |
| DE | 197 55 436 A1 | 6/1999 |
| DE | 696 30 778 T2 | 9/2004 |
| EP | 0 814 918 B1 | 11/2003 |
| GB | 1 496 330 | 12/1977 |
| JP | 63252845 | 10/1988 |
| WO | WO 02088007 A | 11/2002 |

* cited by examiner

SURFACE TREATING INSTALLATION COMPRISING A TRANSFER STATION

RELATED APPLICATIONS

This application claims the filing benefit of International Patent Application No. PCT/EP2005/010708, filed Oct. 5, 2005, which claims the filing benefit of German Patent Application No. DE 10 2004 056 310.1 filed Nov. 22, 2004 the contents of all these documents are incorporated herein by reference.

TECHNICAL FIELD

The invention relates to a surface treatment installation, in particular for treating plastic parts or sheet-metal parts such as for example vehicle bodies, comprising a transfer station for the vertical or horizontal transfer of an article, wherein the transfer station comprises:
a) a stationary supporting structure,
b) a slide that is provided for receiving the article and is displaceable relative to the supporting structure,
c) at least one guide roller, via which the slide is supported on the supporting structure and which has a rotating roller surface.

BACKGROUND OF THE INVENTION

Surface treatment installations of this type, such as are known through use in the background art, are used to treat surfaces of articles in different ways, for example by applying paint and other coatings. Such installations often contain a plurality of individual treatment stations for different treatment steps, for example preparation, painting and drying. The articles to be treated, which may be for example plastic parts or sheet-metal parts such as for example vehicle bodies, are conveyed for this purpose from treatment station to treatment station with the aid of a conveying system.

The present invention is directed to resolving these and other matters.

SUMMARY OF THE INVENTION

The surface treatment installation in the present case also includes the areas between and downstream of the treatment stations where the articles to be treated are merely conveyed, temporarily stored or sorted. For these operations the articles often have to be transferred horizontally or vertically between different conveying systems.

A vertical transfer is necessary when individual stations of the surface treatment installation are for specific reasons disposed in different planes relative to other stations. If the articles are to be treated for example with hot air or other gases that are lighter than the ambient atmosphere, then such a treatment is carried out in a treatment area that is elevated compared to the operating level elsewhere. For this purpose, the articles upstream of the elevated treatment area are lifted up from the operating level and then downstream of the treatment area they are lowered back down to the requisite operating level.

Transfer stations known in the background art generally employ a slide, which is displaceable relative to a stationary supporting structure and on which the articles are fastened during the transfer operation. The slide is supported during the transfer operation via guide rollers on the supporting structure; the guide rollers in this case may be fastened either to the supporting structure or to the slide. The roller surfaces of the guide rollers are made as a rule of a plastics material or rubber because these materials have very good running properties.

In surface treatment installations of the previously described type, very high standards of cleanliness are required. If particles exceeding a specific minimum size deposit on the surfaces being treated in the surface treatment installation, this leads to unacceptable surface defects. Articles affected in this way have to be either rejected as waste or expensively reworked. Generally, particles of a diameter larger than, say, half the thickness of the layer to be applied are regarded as no longer acceptable.

In order to reduce the waste caused by dirt particles and the cost of reworking, such surface treatment installations are subjected to regular and careful cleaning. The transfer stations have to be cleaned particularly often because, there, the fast traverse movements of the slide or temperature differences lead to high flow rates of the ambient air or of another gas mixture. These flows may then entrain dirt particles that have settled on parts of the transfer station.

The object of the invention is to reduce the deposits of larger particles on the articles to be treated in order in this way to reduce the outlay for re-working and/or cleaning.

In a surface treatment installation of the initially described type, this object is achieved in that at least the roller surface of the at least one guide roller is made of an antistatic material, the electrical volume resistivity of which is on average between $10\,\Omega\text{m}$ and $10^9\,\Omega\text{m}$.

The inventors have discovered that in the guide rollers hitherto manufactured from plastics material or rubber, while they are rolling, a considerable electrostatic charge builds up. The electric forces resulting therefrom attract tiny particles from the environment, which gradually deposit on the roller surfaces of the guide rollers. As a result of the recurring rolling operations, the superfine particles that are deposited are pressed together to form larger particles. These finally separate from the guide rollers, mostly during a rolling operation, and, if not previously removed in the course of cleaning operations, may then drop onto the workpieces that are to be treated. These larger particles are then frequently of a size that is no longer acceptable.

By virtue of the design according to the invention of the guide rollers, however, the build-up of an electrostatic charge at the roller surfaces is substantially reduced. This means that small dirt particles from the environment are no longer or are only to a very slight extent electrostatically attracted by the guide rollers and subsequently pressed together to form larger particles. A depositing of larger particles and the consequences associated therewith, namely a high amount of waste, costly re-working and/or frequent cleaning, may therefore be extensively avoided.

The reduction of the cleaning outlay not only has a marked positive influence on the time consumed by the cleaning personnel but also cuts down the maintenance is times of the surface treatment installation. By using the guide rollers according to the invention it is therefore possible to achieve a not inconsiderable increase in the efficiency of the entire surface treatment installation in a very cost-effective manner.

Tests have revealed that a particularly sharp drop in dirt deposits occurs when the volume resistivity of the antistatic material is between $10^3\,\Omega\text{m}$ and $10^6\,\Omega\text{m}$. Even more advantageous properties are presented by materials, the volume resistivity of which is between $10^4\,\Omega\text{m}$ and $10^5\,\Omega\text{m}$.

Antistatic materials as such are common knowledge in the background art. When selecting material, however, care should be taken to ensure that the rolling- and wear properties of the guide rollers are not impaired by the raising of the electric conductivity. Otherwise, there is a risk that possibly increased abrasion will be a new source of the formation of larger particles.

For this reason, in a preferred development of the invention the material contains a nonconductor, for example a thermoplastic polymer or rubber, to which a conductive material has been added. In this case, the nonconductor crucially determines the rolling- and wear properties of the roller surfaces, while the added conductive material, which may for example take the form of particles or fibres, reduces the electrical resistance.

In principle, it would equally be possible to apply an electrically conducting layer onto the roller surfaces. The rolling- and wear properties of such a layer are however generally less advantageous than is the case with the previously described mixed materials.

According to an alternative embodiment, the previously stated object is achieved in that the at least one guide roller has a roller body that substantially comprises a nonconductor, and that there is embedded in the nonconductor an arrangement of metal elements, which extend at least substantially from an axis of rotation of the at least one guide roller radially and preferably approximately rotationally symmetrically in the direction of the roller surface thereof. This combination of a non-conducting roller body with the arrangement of metal elements embedded therein may then likewise have an electrical volume resistivity of between 10 $\Omega$m and $10^9$ $\Omega$m. In this case, however, it has to be borne in mind that this comparatively roughly textured "material" because of its non-homogeneous composition has a resistivity that can be meaningfully measured only over a larger distance.

The elements are preferably bristle-like thin wires, but may for example also take the form of thin sheet-metal strips. As the elements—even after an extended period of use—extend right up to the roller surface, an optimum charge drain is always guaranteed. If the elements in the interior of the roller body are connected to an earthed conductor, then the charges draining from the roller surface may drain off completely from the guide roller. During manufacture of the roller body, first the arrangement of the elements may be provided, which may for example be configured in a similar manner to a bottle brush made of metal bristles. This arrangement is then embedded by casting or vulcanization into an insulator, for example a plastics material having good running properties.

It is self-evident that the present invention may advantageously be used meaningfully also for other types of rollers in transfer stations. Possible examples of these are for example the rollers of accumulating chains or plastic chains.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

Further advantages and features of the invention arise from the following description of the embodiments with reference to the drawings. The drawings show.

DETAILED DESCRIPTION OF THE PRESENT INVENTION

Figure 1:
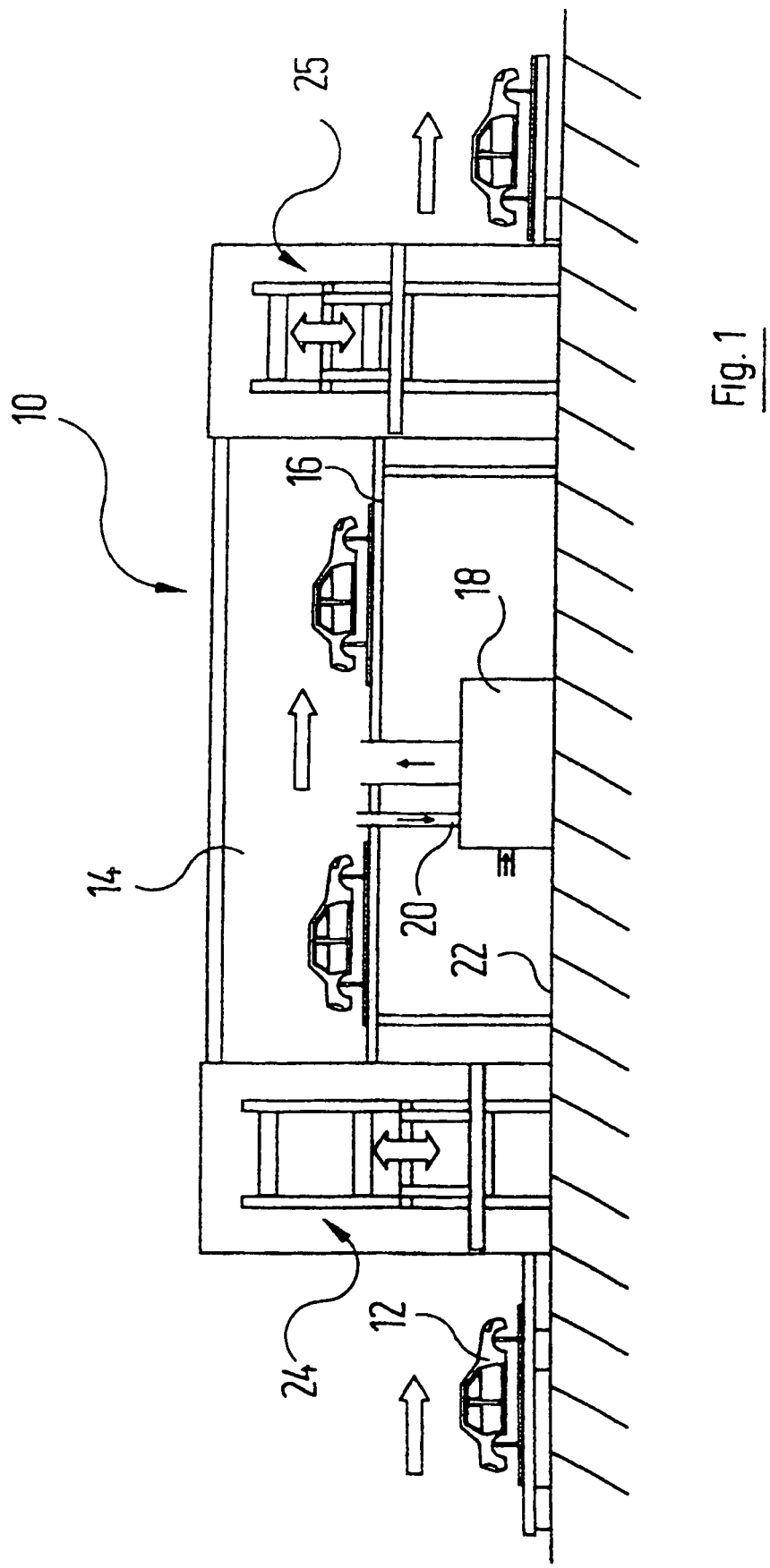
FIG. 1 a diagrammatic side view of part of a coating installation according to the invention for motor vehicle bodies.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

In FIG. 1 part of a coating installation for motor vehicle bodies is shown in a not-to-scale and highly diagrammatic longitudinal section. Said part shown in FIG. 1 is a drying area 10 for the drying of previously coated motor vehicle bodies, there being installed upstream and downstream of this drying area two lifting stations, which will additionally be described in detail.

The drying area 10 comprises an elongate housing 14, on is the floor of which is fastened a conveying device denoted by 16 for the motor vehicle bodies 12. This conveying device 16 may be for example a roller conveyor, a chain conveyor or a combination of both. The drying area 10 further comprises a merely diagrammatically indicated heating device 18, which is used to blow hot air from below into distributing channels that extend along the longitudinal sides of the housing 14. The hot air enriched with solvent vapours may be fed through an outlet 20 back to the heating device 18, where it is cleaned and heated before being fed from there back into the housing 14.

The housing 14 is raised by several meters relative to a floor 22 of a surrounding building. This prevents the hot air, which is introduced from the heating device 18 into the housing 14, from escaping in substantial quantities from the housing 14 at the entrance and exit thereof. Because of the elevated arrangement of the housing 14 relative to the floor 22, the motor vehicle bodies 12 have to be lifted before they may be conveyed through the drying area 10. Conversely, the motor vehicle bodies 12 have to be returned to a lower level at the exit of the drying area 10.

For lifting and lowering the motor vehicle bodies 12 lifting stations 24 and 25 are respectively provided, the particulars of which are described in detail below with reference to FIGS. 2 to 5.

FIGS. 2 to 5 show the lifting station 24 in side view in two different lifting positions, in rear view and in plan view. The lifting station 24 comprises two vertical guide posts 26, 28, which together with an upper crossbeam 30, a central crossbeam 32 and a lower crossbeam 33 form a supporting structure 34. The central crossbeam 32 in this case is connected by two fastening struts 36, 37 to a building intermediate floor 38 in order to remove tilting moments acting upon the guide posts 26, 28.

The guide posts 26, 28 and the crossbeams 30, 32, 33 are each manufactured from steel tubes with a circular cross section. The low planar moment of inertia of the tubes allows a high rigidity of the supporting structure 34 with a low use of material.

Supported on the guide posts 26, 28 in a manner yet to be described in detail is a lifting slide 40, which may be displaced in vertical direction and is fixed in the horizontal relative to the supporting structure 34. The lifting slide 40 is composed of two vertical frame parts 42, 44, two horizontal frame parts 46, 48 and two reinforcing struts 50, 52. The frame parts 42, 44, 46, 48 and the reinforcing struts 50, 52 are manufactured likewise from circular tubes and connected by welding to one another.

Emanating from the vertical frame parts 42, 44 of the lifting slide 40 are work arms 54, 56, which are manufactured likewise from circular tubes. The work arms 54, 56 carry a roller conveyor, which is denoted as a whole by 58 and comprises a plurality of axles disposed in succession. The axles are driven by electric motor and carry on their ends rollers 60. As such roller conveyors 58 are known as such in the background art, a description of further details thereof is not provided.

Figure 2:
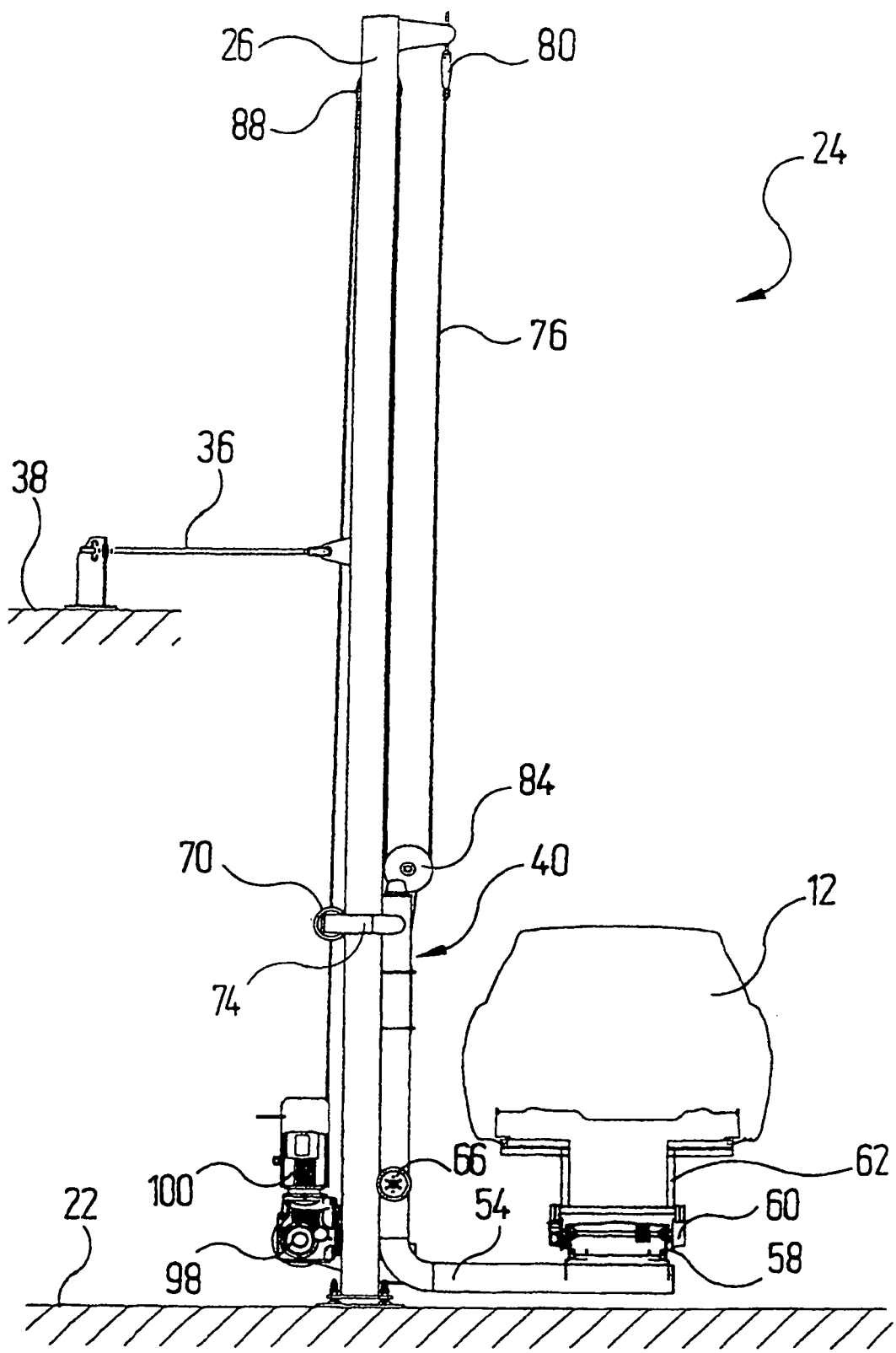
FIG. 2 a side view of a lifting station that is part of the coating installation shown in FIG. 1, wherein a work arm of the lifting device is in the lower lifting position.
Figure 3:
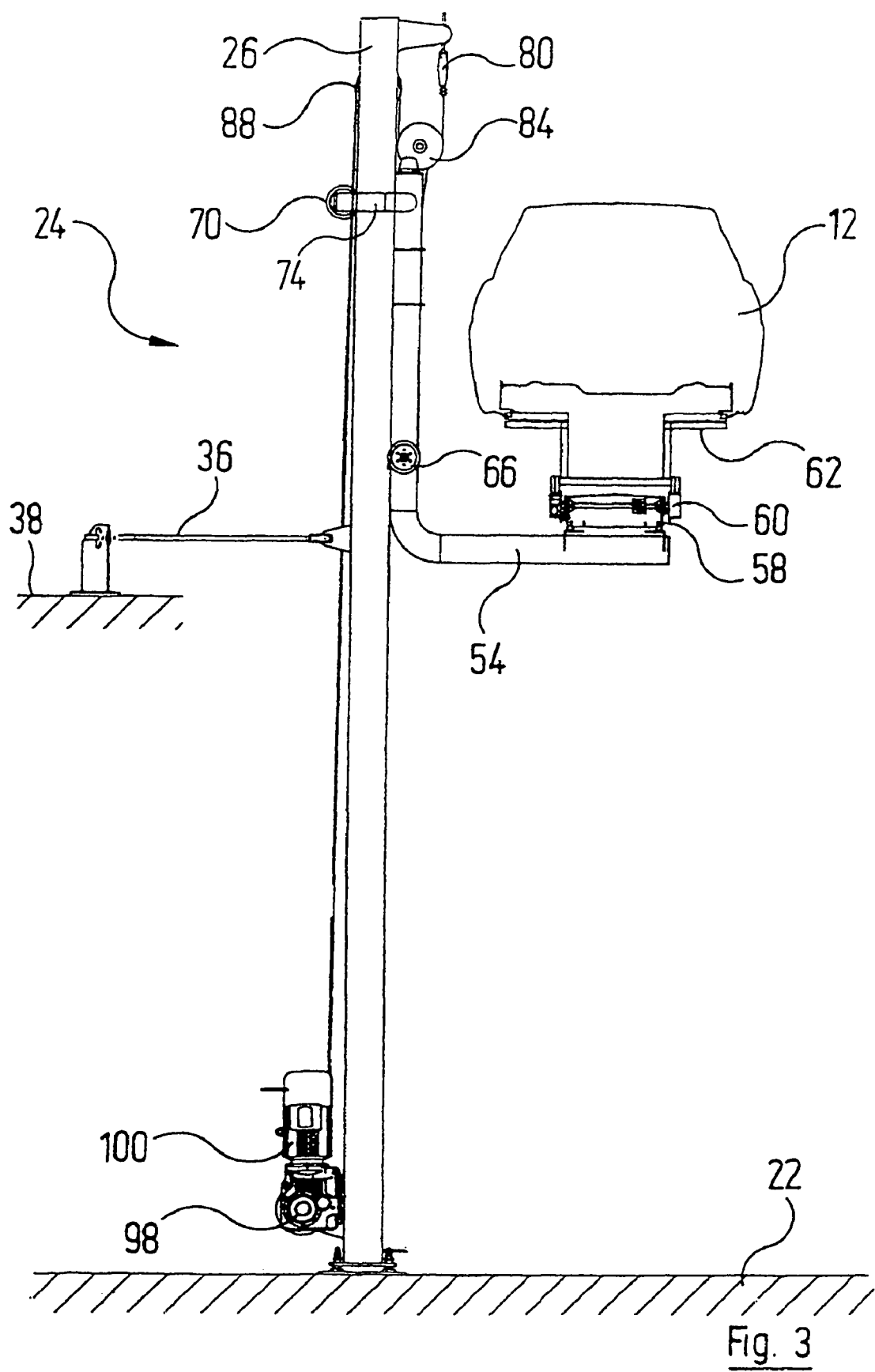
FIG. 3 the side view of the lifting station shown in FIG. 2, wherein the work arm is in the upper lifting position.
Figure 4:
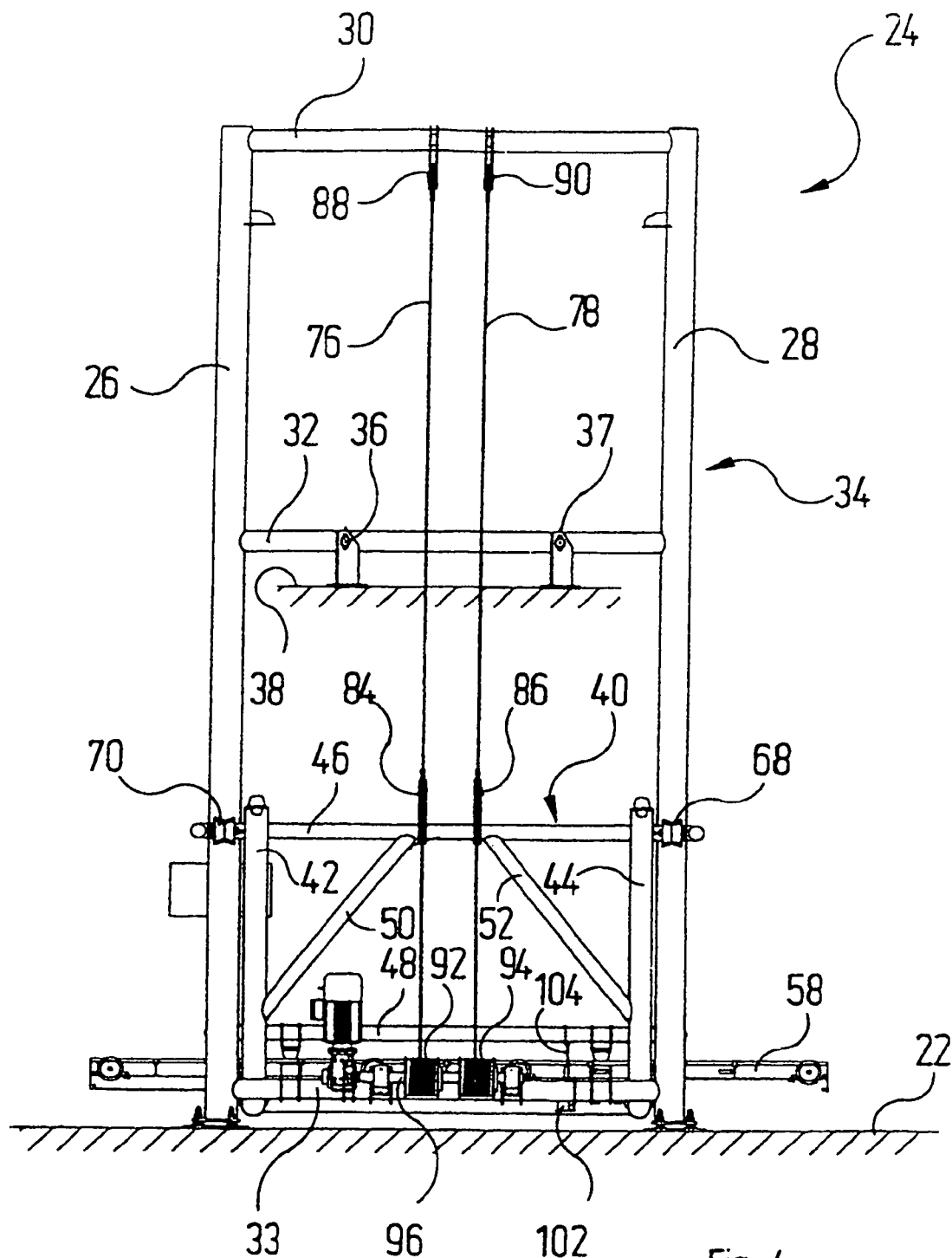
FIG. 4 a rear view of the lifting station shown in FIG. 2 (without vehicle body)
Figure 5:
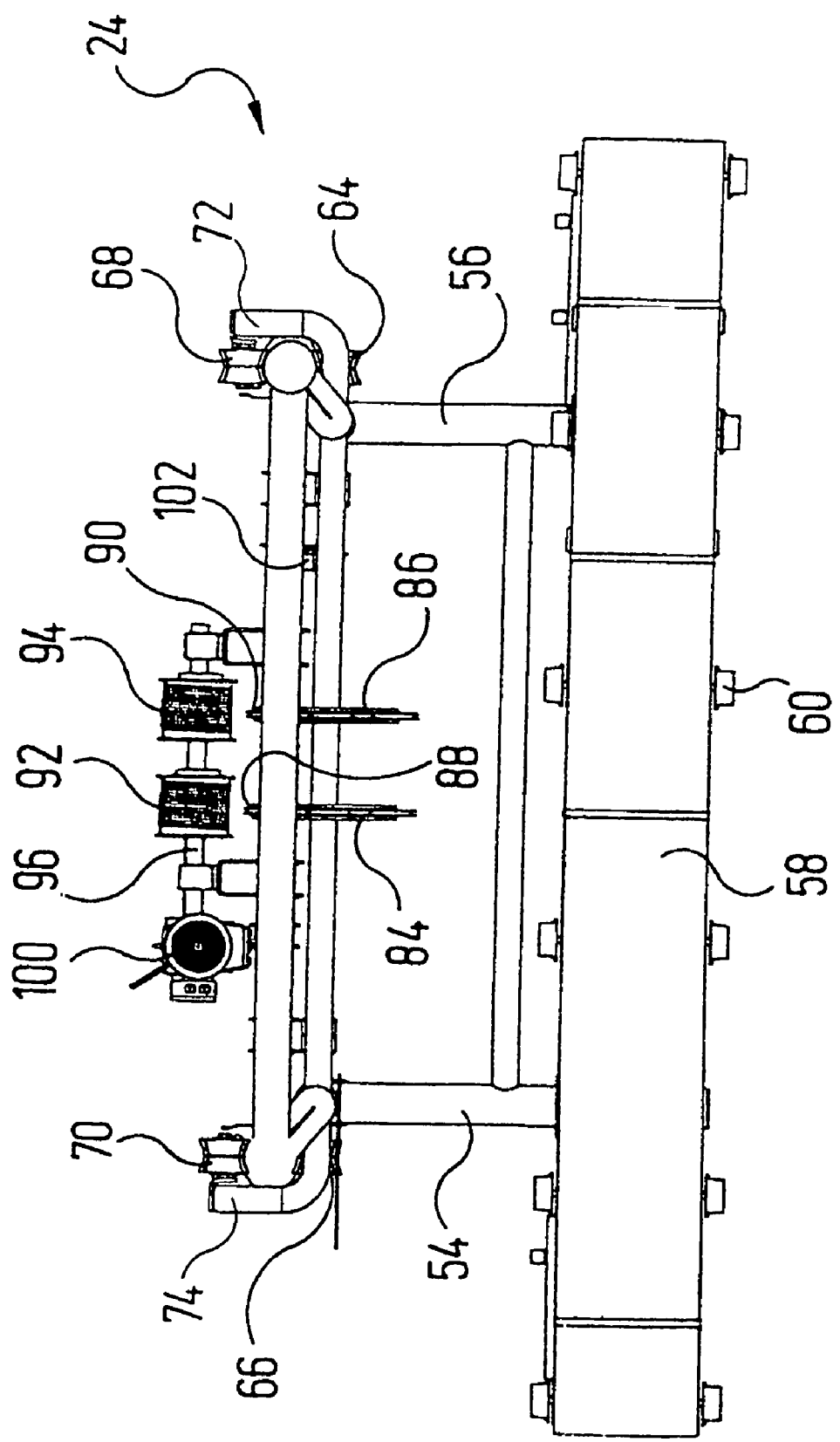
FIG. 5 a plan view of the lifting station shown in FIG. 2 (without vehicle body)

FIGS. 2 and 3 show for illustrative purposes a vehicle body 12, which is fastened on a carrier that is also referred to as a skid and denoted in the drawings by 62. The skid 62 may be displaced in the longitudinal direction of the roller conveyor 58 with the aid of the driven rollers 60. Instead of the roller conveyor 58, an accumulating chain conveyor or a similarly acting conveying means may alternatively be used.

The lifting slide 40 is supported on the supporting structure 34 via a total of four guide rollers, which rest against the guide posts 26, 28. Two guide rollers are fastened at the same height in the rear region of the vertical frame parts 42, 44 and rest against the front faces of the guide posts 26 and 28 respectively. For this reason, they are referred to hereinafter as front guide rollers 64, 66. Two further rollers hereinafter referred to as rear guide rollers 68, 70 are mounted on angles 72 and 74 respectively, which emanate further up from the vertical frame parts 42, 44 of the lifting slide 40 and engage from the side so far round the guide posts 26, 28 that the rear guide rollers 68, 70 rest against the rear faces of the guide posts 26, 28.

The shape of the guide rollers is so selected that the roller surfaces each rest laterally against two opposite points of the tubular guide posts 26, 28, as is shown also in FIG. 6 which is described further below. As an alternative to this, the guide rollers may rest along circular arcs, i.e. along a line, against the guide posts 26, 28. As the guide rollers 64, 66, 68, 70 also partially engage laterally around the guide posts 26, 28, the lifting slide 40 is not only protected against tilting moments about a horizontal tilting axis but is also fixed laterally, i.e. along the longitudinal direction of the crossbeams 30, 32, 33, relative to the supporting structure 34. A more detailed description of the guide rollers 64, 66, 68, 70 is provided further below with reference to FIGS. 6 and 7.

For lifting and lowering the lifting slide 40 a cable drive comprising two steel cables 76, 78 is provided. The two steel cables 76, 78 are fastened to cable fastenings 80 and 82 respectively on the upper crossbeam 30. The free end of each of the steel cables 76, 78 is run in the manner of a double purchase pulley over a deflection pulley 84 and/or 86, which are fastened to the upper horizontal frame part 46 of the lifting slide 40. Via deflection pulleys 88, 90 fastened to the upper crossbeam 30 of the supporting structure 34 the steel cables 76, 78 are run back down, where they are wound onto cable drums 92, 94. The cable drums 92, 94 are driven jointly by a drive shaft 96 that may be set in rotation by a drive motor 100 via a gear 98. For exact determination of the vertical position of the lifting slide 40 there is provided a pulley block sensor 102 comprising a thin measuring cable 104, the free end of which is connected to the lifting slide 40.

There now follows a description of how surface-treated motor vehicle bodies 12 are conveyed through the drying area 10:

An overall control system of the installation ensures that the lifting slide 40 of the lifting station 24 shown on the left in FIG. 1 is displaced into the lower vertical position when a skid 62 with a vehicle body 12 fastened thereon is approaching the lifting station 24. If the roller conveyor 58, which is fastened to the work arm 54 of the lifting station 24, is situated at the same height as a roller conveyor disposed upstream of the lifting station 24, then the skid 62 with the vehicle body 12 fastened thereon is transferred to the roller conveyor 58 of the lifting station 24. Where necessary, the skid 62 may be fixed on the roller conveyor 58 in order to prevent unwanted movements of the skid 62 on the roller conveyor 58 during the lifting of the lifting slide 40 that subsequently occurs.

As soon as the roller conveyor 58 is situated at the height of the conveying system 16, the conveying system 16 takes over the skid 62 carrying the vehicle body 12 and conveys it through the housing 14 swept by hot air. At the end of the housing 14 the motor vehicle body 12 is lowered with the aid of the second lifting station 25 and transferred to a downstream conveying section.

Figure 6:
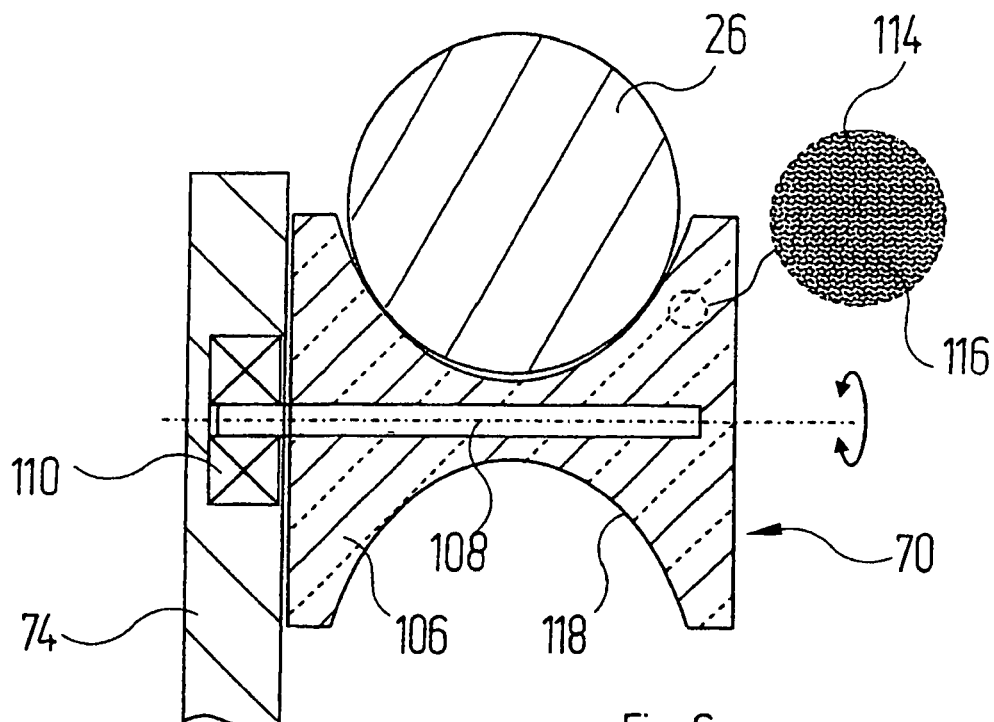
FIG. 6 a guide roller in an axial section.

FIG. 6 shows in a simplified horizontal section further details of the guide rollers, here using the example of the rear guide roller 70. The guide roller 70 comprises a roller body 106, which is slipped in a rotationally fixed manner onto an axle 108. The axle 108 is accommodated in a plain bearing 110, which is fastened to the angle 74 emanating from the lifting slide 40.

The roller body 106 of the guide roller 70 is made of a polyamide, to which small metal particles have been added to reduce the electrical resistance. The metal particles are indicated as dots 116 in a cutout 114. The metal particles 116 reduce the electrical volume resistivity of the polyamide from ca. $10^{12}$ Ωm to a value in the order of magnitude of ca. $10^4$ Ωm.

As a result of this reduction of the electrical resistance the material of the roller body 106 becomes antistatic. Electric charges that arise at a roller surface 118 of the guide roller 70 in the course of rolling along the vertical guide post 26 therefore do not accumulate at the roller surface 118 but may drain into the interior of the roller body 106. The charge-density at the roller surface 118 is thereby reduced to the extent that dirt particles are no longer electrostatically attracted from the ambient air. As the entire roller body 106 is electrically conductive, the guide roller 70 is earthed via the metal axle 108, the plain bearing 110 and the angle 74.

Figure 7:
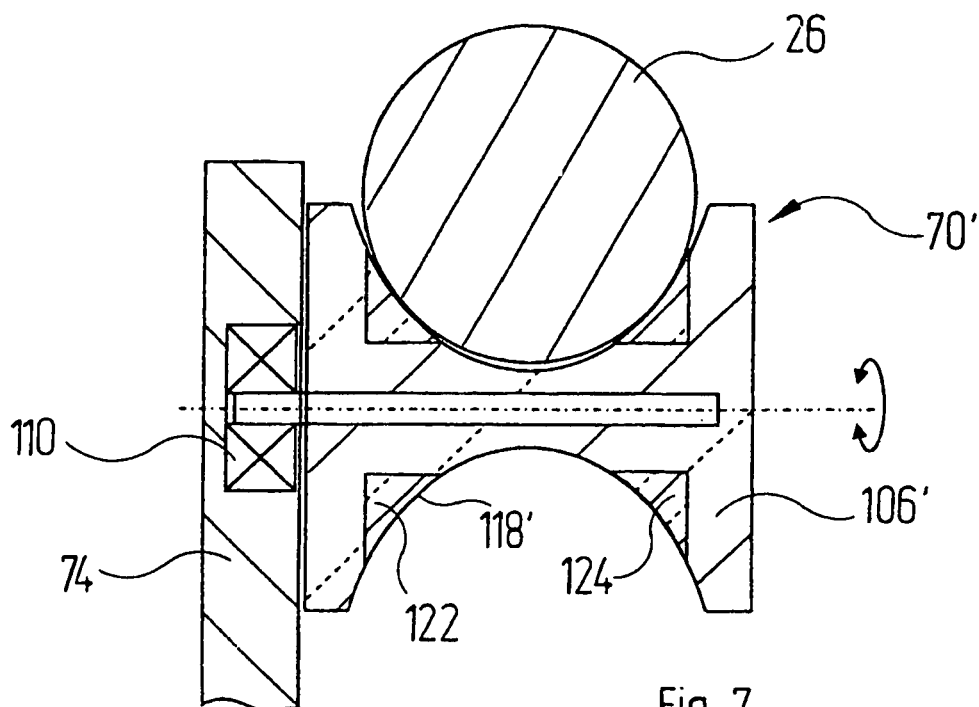
FIG. 7 an alternative development of a guide roller in a representation following FIG. 6.

FIG. 7 shows in a representation following FIG. 6 an alternative, in which a rear guide roller denoted by 70' is manufactured, not entirely, but only in the region of the roller surfaces 118' that actually come into contact with the vertical guide post 26 from an electrostatic material. To said end, there are embedded into the roller body 106, which is made of a standard insulating plastics material, two rings 122, 124 of an approximately triangular cross section, which are manufactured from the antistatic material of the roller body 106 shown in FIG. 6.

Figure 8:
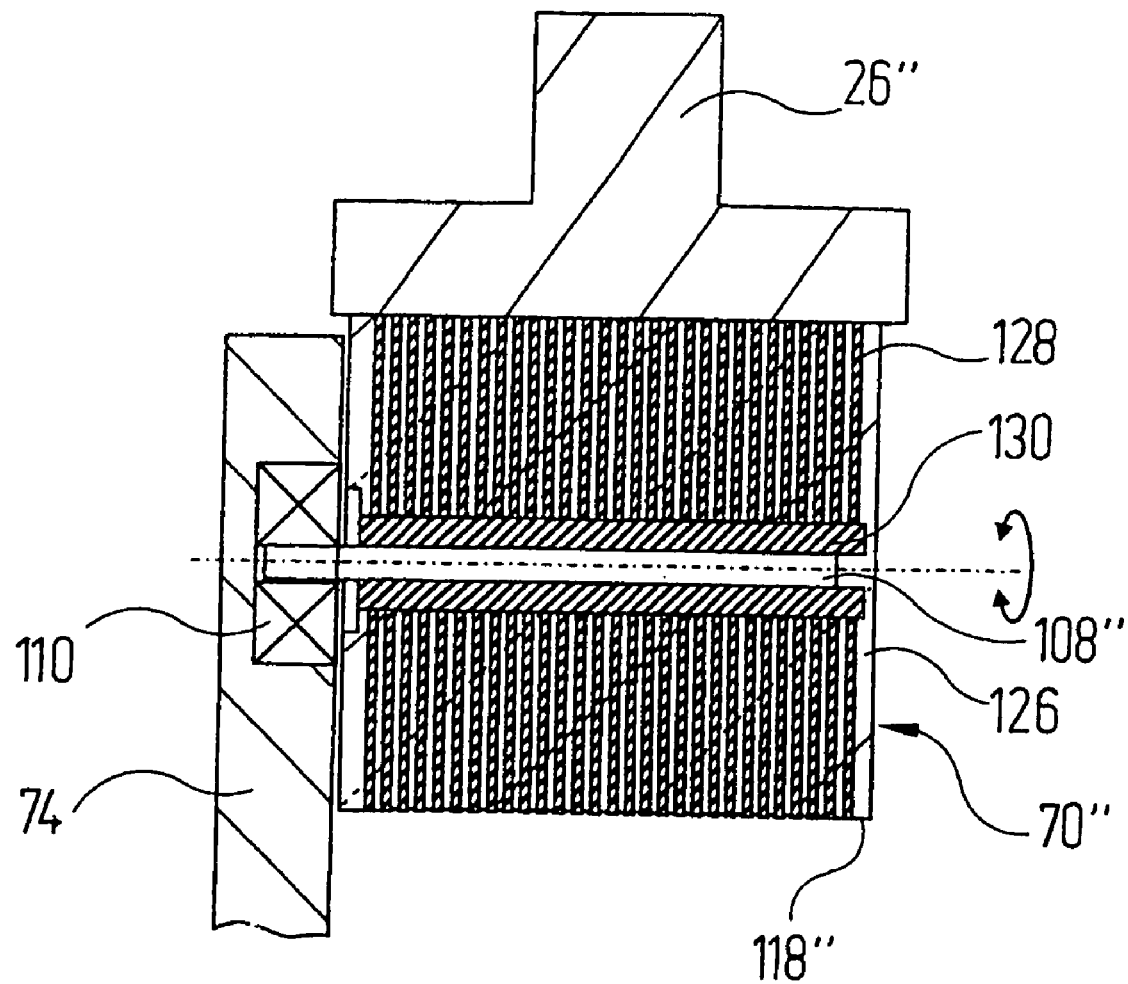
FIG. 8 a further alternative development of a guide roller in a representation likewise following FIG. 6.

FIG. 8 shows in a representation likewise following FIG. 6 a further variant, in which a rear guide roller denoted by 70" has a roller body 106", which is made predominantly of a non-conductive plastics material 126, the electrical volume resistivity of which is markedly greater than $10^9$ Ωm. The plastics material 126 is therefore as such not antistatic. An antistatic overall effect is achieved here by vulcanizing into the plastics material 126 a brush-like arrangement of thin metal bristles 128, which emanate radially and in a substantially rotationally symmetric manner out from a central metal sleeve 130. The metal sleeve 130 surrounded by the plastics material 126 is fastened in a rotationally fixed manner on an axle 108" of the guide roller 70" and earthed via the axle 108".

As the roller body 106" in this embodiment has a cylindrical shape, the contact surface of a guide structure 26', against which the guide roller 70" is supported, is planar.

The bristles 128 extend so far out in radial direction that they adjoin the roller surface 118" of the guide roller 70". There, charges that arise during a rolling operation may drain via the bristles 128 into the interior of the guide roller 70" and be removed via the earthed metal sleeve 128.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A surface treatment installation comprising a transfer station for the vertical or horizontal transfer of an article, wherein the transfer station comprises:
   a) a stationary supporting structure,
   b) a slide that is provided for receiving the article and is displaceable relative to the supporting structure,
   c) at least one guide roller, via which the slide is supported on the supporting structure and which has a roller surface that during a rolling operation is in contact with the supporting structure, wherein
   at least the roller surface of the at least one guide roller is made of an antistatic material, the electrical volume resistivity of which is at least on average between $10\,\Omega m$ and $10^9\,\Omega m$.

2. The surface treatment installation of claim 1, wherein the volume resistivity of the antistatic material is between $10^3\,\Omega m$ and $10^6\,\Omega m$.

3. The surface treatment installation of claim 2, wherein the volume resistivity of the antistatic material is between $10^4\,\Omega m$ and $10^5\,\Omega m$.

4. The surface treatment installation of claim 1, wherein the material contains a nonconductor, to which a conductive material has been added.

5. The surface treatment installation of claim 4, wherein the nonconductor is a thermoplastic polymer or rubber.

6. The surface treatment installation of claim 4, wherein the conductive material is in the form of particles or fibres.

7. The surface treatment installation of claim 1, wherein the material contains an arrangement of metal elements, which are embedded in a nonconductor and extend at least substantially from an axis of rotation of the at least one guide roller radially in the direction of the roller surface thereof.

8. The surface treatment installation of claim 7, wherein the elements are bristle-like resilient wires.

9. The surface treatment installation of claim 1, wherein the at least one guide roller is fastened to the supporting structure.

10. The surface treatment installation of claim 1, wherein the at least one guide roller is fastened to the slide.

11. The surface treatment installation of claim 2, wherein the material contains a nonconductor, to which a conductive material has been added.

12. The surface treatment installation of claim 11, wherein the nonconductor is a thermoplastic polymer or rubber.

13. The surface treatment installation of claim 11, wherein the conductive material is in the form of particles or fibres.

14. The surface treatment installation of claim 2, wherein the material contains an arrangement of metal elements, which are embedded in a nonconductor and extend at least substantially from an axis of rotation of the at least one guide roller radially in the direction of the roller surface thereof.

15. The surface treatment installation of claim 14, wherein the elements are bristle-like resilient wires.

16. The surface treatment installation of claim 2, wherein the at least one guide roller is fastened to the supporting structure.

17. The surface treatment installation of claim 2, wherein the at least one guide roller is fastened to the slide.

18. A transfer station for the vertical or horizontal transfer of an article in a surface treatment installation, comprising:
   a) a stationary supporting structure;
   b) a slide that is provided for receiving the article and is displaceable relative to the supporting structure; and,
   c) at least one guide roller, via which the slide is supported on the supporting structure and which has a roller surface that during a rolling operation is in contact with the supporting structure, wherein
   at least the roller surface of the at least one guide roller is made of an antistatic material, the electrical volume resistivity of which is at least on average between $10\,\Omega m$ and $10^9\,\Omega m$.

* * * * *